United States Patent [19]

Mitchell et al.

[11] 4,018,194

[45] Apr. 19, 1977

[54] ENGINE PISTON WITH INSULATED COMBUSTION CHAMBER

[75] Inventors: Edward Mitchell, Hopewell Junction; John M. Cobb, Cold Spring, both of N.Y.

[73] Assignee: Texaco Inc., New York, N.Y.

[22] Filed: Jan. 6, 1975

[21] Appl. No.: 538,669

[52] U.S. Cl. .............. 123/32 C; 123/32 J; 123/41.35; 123/193 P
[51] Int. Cl.² .................................. F02B 3/00
[58] Field of Search ............ 123/75 B, 32 B, 193 P, 123/30 A, 32 J, 122 R, 32 AA, 191 R, 191 A, 41.35; 92/176

[56] References Cited

UNITED STATES PATENTS

| | | | |
|---|---|---|---|
| 1,926,499 | 9/1933 | Ricardo | 123/75 B |
| 2,868,181 | 1/1959 | Dolza | 123/32 J |
| 3,221,722 | 12/1965 | Bachle | 123/193 P X |
| 3,259,116 | 7/1966 | Bricout | 123/32 C |
| 3,398,726 | 8/1968 | Bricout | 123/32 J |
| 3,545,341 | 12/1970 | Fischer | 123/41.35 X |

FOREIGN PATENTS OR APPLICATIONS

| | | | |
|---|---|---|---|
| 48,325 | 4/1940 | Netherlands | 92/176 |
| 442,340 | 2/1936 | United Kingdom | 123/32 J |
| 363,516 | 12/1931 | United Kingdom | 123/32 A |

*Primary Examiner*—Wendell E. Burns
*Assistant Examiner*—Craig R. Feinberg
*Attorney, Agent, or Firm*—Thomas H. Whaley; Carl G. Ries; Robert B. Burns

[57] ABSTRACT

Piston for an internal combustion engine having an upper face which forms a part of an expandable combustion chamber. The piston is provided with a cavity or deep depression formed in the upper face to promote fuel-air mixing as well as to improve the combustion process within said combustion chamber. The cavity is formed within a cup-like insert member, so positioned within the piston body that the cup-like insert is substantially spaced or insulated from the piston body, thereby avoiding or minimizing heat loss to the piston walls.

1 Claim, 7 Drawing Figures

ENGINE PISTON WITH INSULATED COMBUSTION CHAMBER

The invention herein described was made in the course of, or under a contract or subcontract thereunder, with the U.S. Dept. of Defense.

BACKGROUND OF THE INVENTION

In the operation of many types of internal combustion engines which utilize fuel injection, it is necessary to accomplish optimum fuel-air mixing in order to achieve a more efficient engine operation. This mixing is normally done by the initial compression of the air charge within the compression chamber, after which a desired amount of fuel is introduced into said chamber. The fuel is normally forcibly injected in a concentrated or dispersed spray depending on the disposition of the chamber, as well as on other factors related to the combustion process.

One facility for achieving better combustion resides in the use of a cup-like cavity or depression formed within the face of the piston. This cavity, when of the correct shape and proportions, and when properly arranged with respect to the fuel injector, serves to both mix the fuel with compressed air, as well as to promote a more even combustion process. The latter will usually result in an overall more efficient engine operation.

One detriment inherent to the use of the so-called cup-in-piston arrangement, is that when a pressurized stream of fuel is injected into the cup-like cavity, the fuel will often strike a relatively cold part of the cup wall. This frequently results in condensation of at least a part of the fuel stream into minute particles, which further promotes the production of smoke leaving the engine exhaust system.

Further, since the fuel is in condensed or droplet form it will necessitate an extended residence time to be properly mixed and burned, thereby to avoid the presence of a smoky component in the exhaust stream.

Another factor which contributes to a smoky exhaust condition, is the inability of formed soot to burn within a combustion chamber. This further accentuates the desirability of avoiding the presence of fuel particles which result from the fuel impingement on the combustion chamber walls.

Toward overcoming this inherent problem of excessive exhaust smoke and heat loss in an engine of the type contemplated, there is presently provided means for insulating the shaped cavity in the piston head from the piston body. This is achieved through use of a cup-like insertable member which, when assembled, is substantially thermally separated from the remainder of the piston by a series of intermittently spaced apart support means. Such positioning tends to avoid excessive heat loss, and non-uniform cooling of the combustion chamber itself due to heat transfer through piston walls.

An object of the invention therefore is to provide a novel piston structure for an engine, which promotes a more rapid and uniform combustion of a fuel-air mixture. A further object is to provide a piston for an engine which utilizes fuel injection wherein the walls of the combustion chamber are so arranged to avoid the creation of smoke during the combustion process. A still further object is to provide a piston having a cavity formed in the head, being adaptable to promote a uniform combustion process while avoiding the occurrence of cold sections on the piston cavity wall which result from heat losses through the piston and into the engine cooling system.

DESCRIPTION OF THE DRAWINGS

Referring to the drawings, FIG. 1 illustrates a segment of an engine of the type presently contemplated including a body 10 which is structured having a plurality of cavities or cylinders 11. Each cylinder 11 is capable of receiving a piston 12 for reciprocal motion therein. Each piston is further connected to a crankshaft not shown which is rotatably driven as the respective pistons are sequentially actuated.

Figure 1:
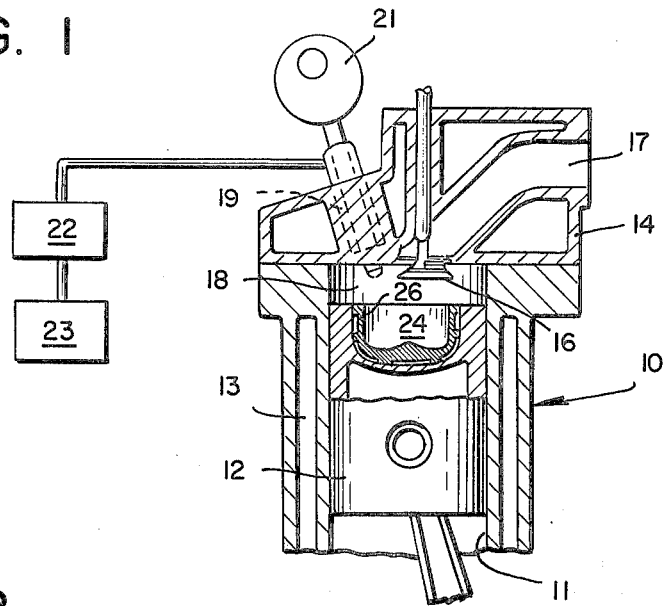
FIG. 1 is a segmentary view in cross section of an internal combustion engine of the type contemplated.

Normally the engine is provided as shown with a series of internal cooling passages 13. The latter are formed in and through the various engine compartment walls to regulate and maintain the operating temperature at a desired level. These cooling passages 13 are connected to a pump or similar cooling circuit whereby coolant medium is continuously circulated through the engine as well as through heat exchange or cooling means.

Without the necessary cooling of the engine the latter would become excessively hot, thus resulting in cooperating parts becoming distorted and possibly seized in place. It is therefore essential to dispose of a certain amount of the heat generated during the engine operating period.

Toward further assisting in the necessary cooling process, the engine lubricating system can be provided with a splash lubricating arrangement. Thus, oil continuously splashed up under piston 12 from the crankcase serves to draw heat from the latter and into the oil reservoir.

The upper end of engine body 10 is provided with a head 14 formed over each of the respective piston cavities 11. Said head 14 further includes inlet valve 16 and outlet valves as needed, for the introduction of charge to the combustion chamber and for the discharge of exhaust gases therefrom. As shown, an air passage 17 can be connected with an air pump, carburetor or the like, to direct air or fuel-air charge into combustion chamber 18 during the piston intake stroke.

Said head 14 is further provided with a plurality of fuel injectors 19. Each injector is so positioned with respect to inlet valve 16 to permit injection of a desired amount of fuel for a predetermined period of time during the piston compression and power strokes. Injectors 19 are sequentially operated in accordance with the position of piston 12 by a cam 21 or similar member operably coordinated with movement of the piston. The respective injectors 19 as shown are normally connected to a fuel pump 22 as well as to a source of fuel 23.

Although not presently shown in detail, for the present description, each cylinder 11 of the engine is further provided with ignition means such as one or more spark plugs. The latter are positioned within engine head 14 in such a way to ignite the charge at a desired time.

Exemplary of the function of the instant invention, in the instance of the operation of an internal combustion engine as disclosed in U.S. Pat. 2,484,009, Barber, air is introduced through intake valve 16 in a manner to be rapidly urged through combustion chamber 18 in a swirling motion or pattern. As piston 12 rises during a compression stroke, air is rapidly swirled around combustion chamber 18 until the latter is reduced to a minimum at the piston top dead center position. At this time the air stream is swirled at a more rapid rate within the reduced diameter, cup-like cavity 24 in the piston head.

At this point in the engine cycle, i.e. just prior to top dead center, fuel injection is timed to commence. Injection will then continue for a desired period as piston 12 commences to retreat during the power stroke. Thus, the spark plug, while not presently shown, can be so arranged with respect to the fuel injector 19 and intake valve 16, as to readily ignite the localized fuel mixture formed by the incoming fuel stream as it mixes with swirling air.

Operationally, it is desirable that fuel entering combustion chamber 18 is atomized into minute particles thereby to establish a better localized fuel-air mixture, which will in turn promote a rapid and even burning event. However, at least a part of the injected fuel stream will impinge against a wall of the cup-like cavity 24. Alternately the heavier particles will be thrown against the curved wall by the action of the swirling stream which carries the fuel particles circularly through cavity 24.

As previously noted, it has been found that when injected liquid fuel strikes a relatively cool portion of cavity 24, the fuel will tend to condense into droplets. Further, as the fuel-air charge is ignited, not only will exhaust gas be formed, but the latter will embody a considerable amount of smoke and unburned liquid fuel particles. This is due at least in part to the lack of opportunity for fuel droplets to be intermixed with, and combusted with the air prior to be discharged.

Figure 2:
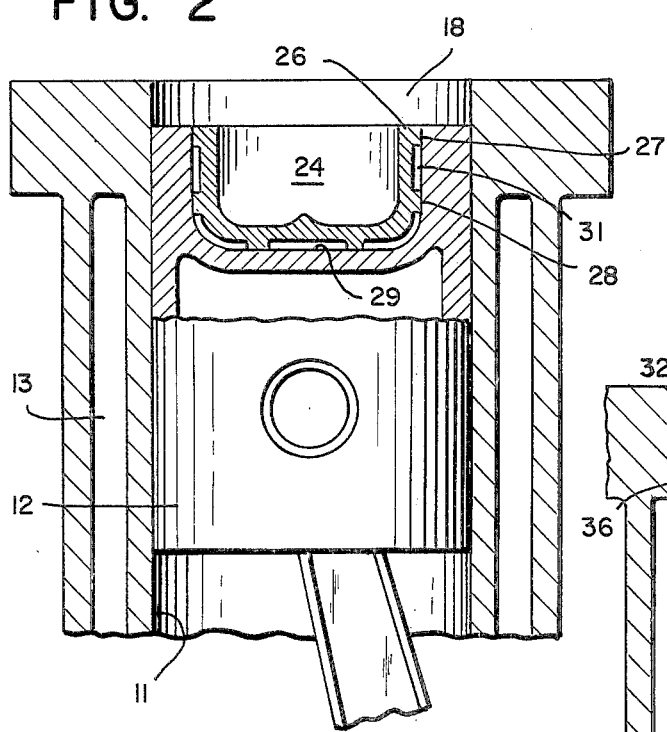
FIG. 2 is a segmentary view on an enlarged scale of the piston of FIG. 1.

Referring to FIG. 2, in accordance with the invention each piston 12 of the engine is provided with an insert member 26 which fits firmly into the piston head and yet forms a relatively poor heat conductive path between the insert and the piston body walls. Thus, there will be minimal opportunity for combustion heat to be carried away from the walls of said member 26. This minimal path for heat flow is assured through the function of an air, or similar low thermally conductive barrier or channel defined between the contiguous walls of the adjacent piston cavity and insert member.

Physically, insertable member 26 having the cup-like cavity 24 formed therein, is provided with a sufficiently thick wall to maintain structural integrity as the pressure builds within the combustion chamber 18 during each cycle. The cylindrical walls of cavity 24 are preferably smooth and evenly contoured to best guide the swirling air thereabout during the compression stroke, as well as to direct exhaust gases during the power stroke.

The floor of cavity 24 is shown in the drawings, as being shaped or contoured to best assure the desired flow of fuel-air charge and gas therethrough. In the present arrangement the center of the cavity floor is provided with an upstanding or convex section thereby to best guide the stream of gas.

As shown in FIG. 2, the external surfaces of insert member 26 are provided with a series or network of upstanding ribs 27 and 28, which are raised slightly from the cup surface. The outer face of each rib is designed to engaged the corresponding walls of depression 29 formed in the piston head, thereby defining an air space or heat barrier 31 between the respective ribs 27 and 28 as well as between the adjacent piston 12 and insert member 26 walls.

Subsequent to being positioned into the piston head, insertable member 26 can be welded, soldered, or otherwise maintained in place. Alternatively said member can be performed to be force fitted into the piston depression 29 and there retained by virtue of the tight engagement between said members.

As shown in FIG. 2, the respective insulating barrier or passages 31 extend continuously about the periphery and lower side of the insert walls 26. These ribs 27 and 28 forming the insulating barrier 31, can be continuous or appropriately arranged to assure the necessary structural strength as well as desired minimal heat transfer.

Figure 3:
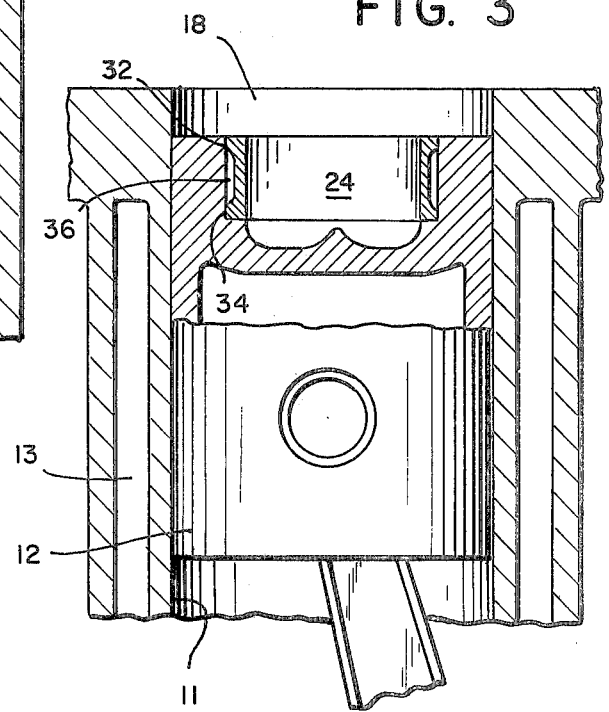
FIG. 3 is an alternate embodiment of the arrangement of FIG. 2.

As shown in FIG. 3, an alternate embodiment of insert member 32 is provided with adjacently positioned upper and lower protruding ribs 33 and 34. The latter are arranged to slidably engage annular depression 36 formed within the piston head.

In this instance, insert 32 comprises essentially a cylindrical ring, which, when inserted in place, forms a substantially insulated belt about the periphery of combustion chamber 37. In the instance of the use of a fuel injector, the latter may have to be arranged due to structural requirements, that incoming pressurized fuel will strike the walls of the ring insert 32. Since the latter is substantially separated from the body of piston 38, there will be no cool spots present to condense fuel or to quench the subsequently generated flame.

Figure 4:
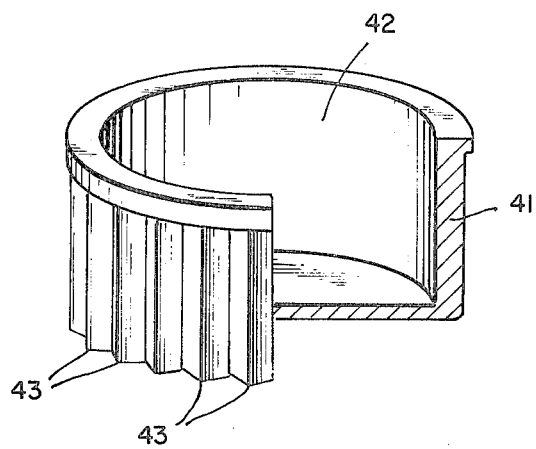
FIGs. 4 to 7 inclusive represent further embodiments of the insertable member.
Figure 5:
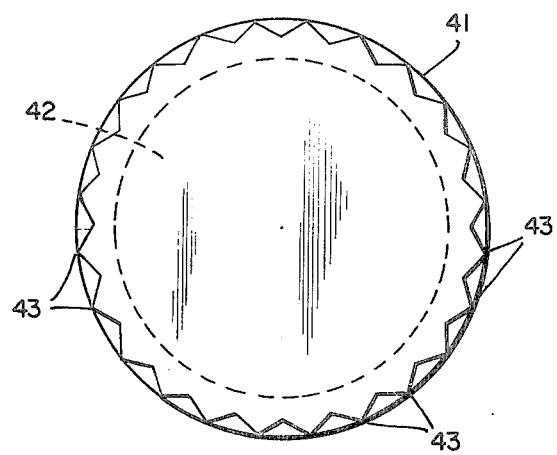

In the embodiment shown in FIGS. 4 and 5, insertable member 41 comprises a cup-like arrangement which forms a cylindrical combustion chamber 42. The outer peripheral edge of said member 41 is provided with a series of sharp edged longitudinal ribs or serrations 43 cut into the wall surface. The serrations are preferably equispaced and are of sufficient number to assure firm anchoring in the piston. While the serrations 43 can be most readily formed in the cup-like member, it is understood they can be cast or otherwise formed within the piston depression.

In any event the cylindrical depression formed in the piston head is of sufficient diameter to permit forced entry of the insertable member 41 thereinto whereby the two will be firmly joined. Thus, physical engagement between the cup and the piston when assembled, will be limited due to the relatively small aggregate of the respective line contact areas defined by the sharpened edges of the respective serrations 43.

Figure 6:
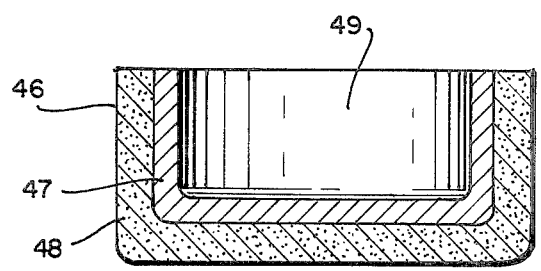

In a still further embodiment as shown in FIG. 6, cup-like member 46 is formed essentially of a matrix 47 which can be metal such as cast iron or the like. During the casing of the matrix cup an outer surface or coating 48 is in effect bonded thereto, which coating comprises a low thermally conducted material.

The coating is formed in its capacity as an insulator, of a material such as sand or asbestos which are integral with the metallic matrix, being retained by the latter to contact corresponding surfaces of the piston depression. Cylindrical combustion chamber 49 will thereby pass only a minimal flow of heat through coating 48 to the adjacent piston body.

Figure 7:
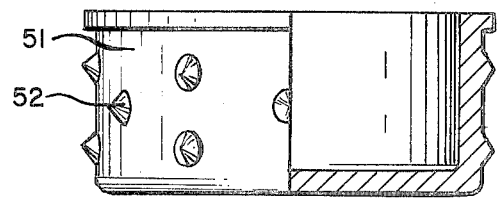

The combustion chamber insert member can be firmly fitted into the piston head in any number of ways so as to be safely retained under all engine operating conditions. One such means is shown in FIG. 7. Here the outer surface 51 of the cup insert is provided with a knurled or other roughened contour such as a series of discrete dimples or segments 52 standing out from the cup wall. Thus, when assembled, although the raised knurled portions will firmly grip the piston head depression, the intermediate air passages between the projection will furnish the required insulating layer.

In each of the above embodiments shown the insertable cup can be retained solely by physical contact with the piston. However, in each instance the contact area must not only afford maximum insulating properties but the tightness of the combustion chamber must be maintained.

Other modifications and variations of the invention as hereinbefore set forth may be made without departing from the spirit and scope thereof, and therefore, only such limitations should be imposed as are indicated in the appended claims.

We claim:

1. In a piston for an internal combustion engine which utilizes fuel injection to establish a combustible fuel-air mixture within the engine combustion chamber said piston including; a body with a head having a face which opens into a combustion chamber into which fuel is introduced to establish the combustible mixture,
   an insert member fixedly positioned within said piston body and being supportably spaced from the latter to define a thermal barrier whereby to substantially insulate said combustion chamber from the piston thereby to minimize heat flow therebetween,
   said insert member having means forming a recessed cavity therein which is communicated with said combustion chamber, said insert member further including an outer wall having a plurality of discretely spaced conical segments depending outwardly from said insert member wall and having the conical points of said segments at least partially embedded into the wall of said piston whereby said thermal barrier comprises an air gap.

* * * * *